United States Patent
Kim

(10) Patent No.: US 6,915,231 B2
(45) Date of Patent: Jul. 5, 2005

(54) METHOD AND APPARATUS FOR DETERMINING A HEAD POSITION OF A VEHICLE DRIVER

(75) Inventor: Cheol Han Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/750,682

(22) Filed: Dec. 31, 2003

(65) Prior Publication Data

US 2005/0027472 A1 Feb. 3, 2005

(30) Foreign Application Priority Data

Jul. 28, 2003 (KR) ................. 10-2003-0051907

(51) Int. Cl.$^7$ ............ G01C 9/00; G06F 15/00
(52) U.S. Cl. ................. 702/151
(58) Field of Search .......... 702/94, 95, 150–154; 701/45, 49; 359/838, 841, 843, 876

(56) References Cited

U.S. PATENT DOCUMENTS

| | | | | |
|---|---|---|---|---|
| 5,694,259 A | * | 12/1997 | Brandin | 359/843 |
| 5,706,144 A | * | 1/1998 | Brandin | 359/843 |
| 6,304,187 B1 | * | 10/2001 | Pirim | 340/576 |
| 6,717,518 B1 | * | 4/2004 | Pirim et al. | 340/576 |

FOREIGN PATENT DOCUMENTS

| | | |
|---|---|---|
| EP | 1050032 | 11/2000 |
| JP | 02-293229 | 4/1990 |

* cited by examiner

Primary Examiner—Michael Nghiem
(74) Attorney, Agent, or Firm—Morgan Lewis & Bockius LLP

(57) ABSTRACT

The present invention relates to a method and apparatus for determining a head position of a vehicle driver that has non-limiting advantages of enhanced accuracy and/or precision without excessive increase of manufacturing cost of the vehicle. A vehicle is provided with at least one of a left rearview mirror and a right rearview mirror, a head position of a vehicle driver may be determined on the basis of at least one of vertical and horizontal inclination angles of the at least one rearview mirror.

22 Claims, 4 Drawing Sheets

METHOD AND APPARATUS FOR DETERMINING A HEAD POSITION OF A VEHICLE DRIVER

CROSS-REFERENCE TO RELATED APPLICATIONS

This application claims priority of Korean Application No. 10-2003-0051907, filed on Jul. 28, 2003, the disclosure of which is incorporated fully herein by reference.

FIELD OF THE INVENTION

Generally, the present invention relates to a vehicle. More particularly, the present invention relates to a method and apparatus for determining a head position of a vehicle driver.

BACKGROUND OF THE INVENTION

Recently, vehicle safety has become a much more important factor in vehicle manufacture, and accordingly, techniques for determining a head position of a driver have garnered strong interest. For instance, the head position of the driver may act as an important parameter in an algorithm for controlling operation of an air bag.

In one known way of determining the head position of the driver according to the related art utilizes the position of the driver's seat in a front and rear direction. A sensor may be used for detecting a seat position of a seat moving track, and on the basis of the output of the sensor, the head position of the driver may be estimated. Such an estimate, however, may result in rough measurement of the head position.

For example, the head position of the driver may vary at the same seat position, according to how much a seat back is inclined, and/or the posture of the driver. Therefore, sufficient accuracy and/or precision may not be expected from such a method of determining the head position of the driver.

One of the ways that may be expected to show enhanced precision/accuracy is through disposing a camera in an interior of the vehicle and calculating the head position of the driver from an image obtained by the camera. However, this approach may only be enabled by adopting a stereo camera or at least two normal cameras, which results in an excessive increase of manufacturing cost of the vehicle.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

The present invention relates to a method and apparatus for determining a head position of a vehicle driver that has non-limiting advantages of enhanced accuracy and/or precision without excessive increase of manufacturing cost of the vehicle.

An exemplary method according to an embodiment of the present invention determines a head position of a driver of a vehicle, the vehicle being equipped with at least one of left and right rearview mirrors.

In the exemplary method, in at least one of horizontal and vertical directions, an inclination angle of the at least one rearview mirror may be detected, and subsequently, a range of the head position of the vehicle driver may be calculated on the basis of the inclination angle.

In a preferable embodiment, the exemplary method includes detecting a first horizontal angle $\theta_L$, calculating a first horizontal angle range of the head position with respect to the left rearview mirror, detecting a second horizontal angle $\theta_R$, and calculating a second horizontal angle range of the head position with respect to the right rearview mirror.

The first horizontal angle denotes an inclination angle of the left rearview mirror in a horizontal direction, and the first horizontal angle range is calculated on the basis of the first horizontal angle $\theta_L$. In the same way, the second horizontal angle denotes an inclination angle of the right rearview mirror in the horizontal direction, and the second horizontal angle range is calculated on the basis of the second horizontal angle $\theta_R$.

The first horizontal angle range preferably includes, toward a vehicle body from the rearward direction of the vehicle body, a range of $2\theta_L - \Delta\theta_L$ to $2\theta_L + \Delta\theta_L$. Also, the second horizontal angle range preferably includes, toward a vehicle body from the rearward direction of the vehicle body, a range of $2\theta_R - \Delta\theta_R$ to $2\theta_R + \Delta\theta_R$. Here, the angles $\Delta\theta_L$ and $\Delta\theta_R$ may be predetermined angles.

More preferably, the $\Delta\theta_R$ satisfies $\Delta\theta_R = \tan^{-1}(r/l)$, and the $\Delta\theta_L$ satisfies $\Delta\theta_L = \tan^{-1}(r/l)$. Here, r denotes a horizontal distance between the vehicle body and a center of the rearview mirror, and l denotes a horizontal distance between an end of the vehicle body and a center of the rearview mirror.

In a further embodiment, the method further includes detecting a first vertical angle $\phi_L$, calculating a first vertical angle range of the head position with respect to the left rearview mirror, detecting a second vertical angle $\phi_R$, and calculating a second vertical angle range of the head position with respect to the right rearview mirror.

Here, the first vertical angle denotes an inclination angle of the left rearview mirror in a vertical direction, and the first vertical angle range is calculated on the basis of the first vertical angle $\phi_L$. In the same way, the second vertical angle denotes an inclination angle of the right rearview mirror in a vertical direction, and the second vertical angle range is calculated on the basis of the second vertical angle $\phi_R$.

It is further preferable that, upward from a horizontal plane of a vehicle body, the first vertical angle range includes a range of $\phi_L + \Delta\phi_{L1}$ to $\phi_L + \Delta\phi_{L2}$, and the second vertical angle range includes a range of $\phi_R + \Delta\phi_{R1}$ to $\phi_R + \Delta\phi_{R2}$. Here, the angles $\Delta\phi_{L1}$, $\Delta\phi_{L2}$, $\Delta\phi_{R1}$, and $\Delta\phi_{R2}$ may be predetermined angles.

In another exemplary method of the present invention (e.g., a method without including steps relating to horizontal angles), the method may include detecting a first vertical angle $\phi_L$, calculating a first vertical angle range of the head position with respect to the left rearview mirror, detecting a second vertical angle $\phi_R$, and calculating a second vertical angle range of the head position with respect to the right rearview mirror.

Here, the first vertical angle may denote an inclination angle of the left rearview mirror in a vertical direction, and the first vertical angle range may be calculated on the basis of the first vertical angle $\phi_L$. In the same way, the second vertical angle denotes an inclination angle of the right rearview mirror in a vertical direction, and the second vertical angle range may be calculated on the basis of the second vertical angle $\phi_R$.

As described above, it may be further preferable that upward from a horizontal plane of a vehicle body, the first vertical angle range includes a range of $\phi_L + \Delta\phi_{L1}$ to $\phi_L + \Delta\phi_{L2}$, and the second vertical angle range includes a range of $\phi_R + \Delta\phi_{R1}$ to $\phi_R + \Delta\phi_{R2}$. Here, the angles $\Delta\phi_{L1}$, $\Delta\phi_{L2}$, $\Delta\phi_{R1}$, and $\Delta\phi_{R2}$ may be predetermined angles.

In one exemplary embodiment of the present invention an apparatus may determine a head position of a vehicle driver, the vehicle being equipped with left and right rearview mirrors.

The exemplary apparatus includes a first horizontal angle detector for detecting a first horizontal angle $\theta_L$, a second horizontal angle detector for detecting a second horizontal angle $\theta_R$, and an electronic control unit (ECU) for calculating the head position of the driver on the basis of the first and second horizontal angles $\theta_L$ and $\theta_R$ that are detected at the first and second horizontal angle detectors respectively.

Here, the first horizontal angle denotes an inclination angle of the left rearview mirror in a horizontal direction, and the second horizontal angle denotes an inclination angle of the right rearview mirror in the horizontal direction.

The ECU detects the first horizontal angle $\theta_L$, and accordingly calculates, on the basis of the first horizontal angle $\theta_L$, a first horizontal angle range of the head position with respect to the left rearview mirror. The ECU also detects the second horizontal angle $\theta_R$, and accordingly calculates, on the basis of the second horizontal angle $\theta_R$, a second horizontal angle range of the head position with respect to the right rearview mirror.

The first horizontal angle range preferably includes, toward a vehicle body from the rearward direction of the vehicle body, a range of $2\theta_L - \Delta\theta_L$ to $2\theta_L + \Delta\theta_L$. Also, the second horizontal angle range preferably includes, toward a vehicle body from the rearward direction of the vehicle body, a range of $2\theta_R - \Delta\theta_R$ to $2\theta_R + \Delta\theta_R$. Here, the angles $\Delta\theta_L$ and $\Delta\theta_R$ may be predetermined angles.

More preferably, the $\Delta\theta_R$ satisfies $\Delta\theta_R = \tan^{-1}(r/l)$, and the $\Delta\theta_{L\, satisfies}$ $\Delta\theta_L = \tan^{-1}(r/l)$. Here, r denotes a horizontal distance between the vehicle body and a center of the rearview mirror, and l denotes a horizontal distance between a rear end of the vehicle body and a center of the rearview mirror.

In a further embodiment, the apparatus further includes a first vertical angle detector for detecting a first vertical angle $\phi_L$ and a second vertical angle detector for detecting a second vertical angle $\phi_R$. Here, the first vertical angle denotes an inclination angle of the left rearview mirror in a vertical direction, and the second vertical angle denotes an inclination angle of the right rearview mirror in a vertical direction, In this case, the electronic control unit further detects the first vertical angle $\phi_L$, and accordingly calculates, on the basis of the first vertical angle $\phi_L$, a first vertical angle range of the head position with respect to the left rearview mirror. In addition, the electronic control unit further detects the second vertical angle $\phi_R$, and accordingly calculates, on the basis of the second vertical angle $\phi_R$, a second vertical angle range of the head position with respect to the right rearview mirror.

It is further preferable that, upward from a horizontal plane of a vehicle body, the first vertical angle range includes a range of $\phi_L + \Delta\phi_{L1}$ to $\phi_L + \Delta\phi_{L2}$, and the second vertical angle range includes a range of $\phi_R + \Delta\phi_{R1}$ to $\phi_R + \Delta\phi_{R2}$. Here, the angles $\Delta\phi_{L1}$, $\Delta\phi_{L2}$, $\Delta\phi_{R1}$, and $\Delta\phi_{R2}$ may be predetermined angles.

In another exemplary embodiment of the present invention (e.g., an apparatus without including devices and/or steps relating to horizontal angles), the apparatus may include a first vertical angle detector for detecting a first vertical angle $\phi_L$, a second vertical angle detector for detecting a second vertical angle $\phi_R$, and an electronic control unit (ECU) for calculating the head position of the driver on the basis of the first and second vertical angles $\phi_L$ and $\phi_R$ that are detected at the first and second vertical angle detectors respectively. Here, the first vertical angle denotes an inclination angle of the left rearview mirror in a vertical direction, and the second vertical angle denotes an inclination angle of the right rearview mirror in a vertical direction.

The ECU detects the first vertical angle $\phi_L$, and accordingly calculates, on the basis of the first vertical angle $\phi_L$, a first vertical angle range of the head position with respect to the left rearview mirror. The ECU also detects a second vertical angle $\phi_R$, and accordingly calculates, on the basis of the second vertical angle $\phi_R$, a second vertical angle range of the head position with respect to the right rearview mirror.

As described above, it is further preferable that upward from a horizontal plane of a vehicle body, the first vertical angle range includes a range of $\phi_L + \Delta\phi_{L1}$ to $\phi_L + \Delta\phi_{L2}$, and the second vertical angle range includes a range of $\phi_R + \Delta\phi_{R1}$ to $\phi_R + \Delta\phi_{R2}$. Here, the angles $\Delta\phi_{L1}$, $\Delta\phi_{L2}$, $\Delta\phi_{R1}$, and $\Delta\phi_{R2}$ may be predetermined angles.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

An exemplary embodiment of the present invention will hereinafter be described in detail with reference to the accompanying drawings.

Figure 1:
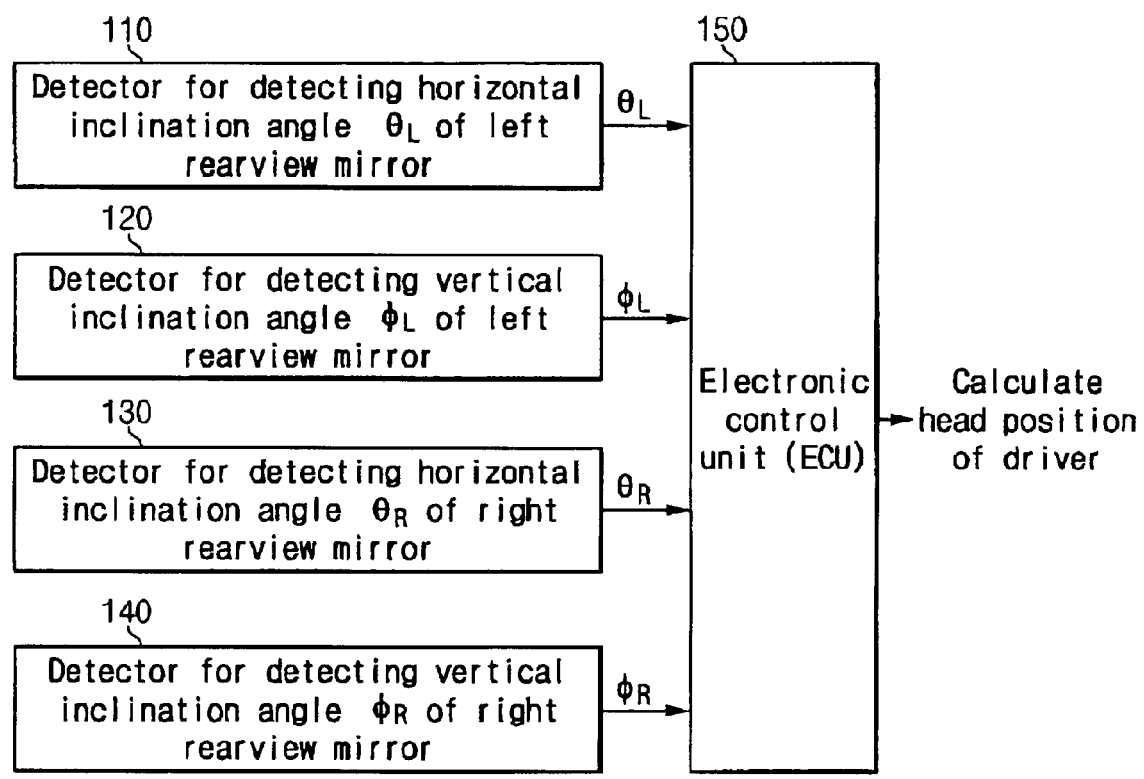
FIG. 1 is a block diagram of an apparatus for determining a head position of a vehicle driver according to an exemplary embodiment of the present invention.

FIG. 1 is a block diagram of an apparatus for determining a head position of a vehicle driver according to an exemplary embodiment of the present invention.

Figure 2:
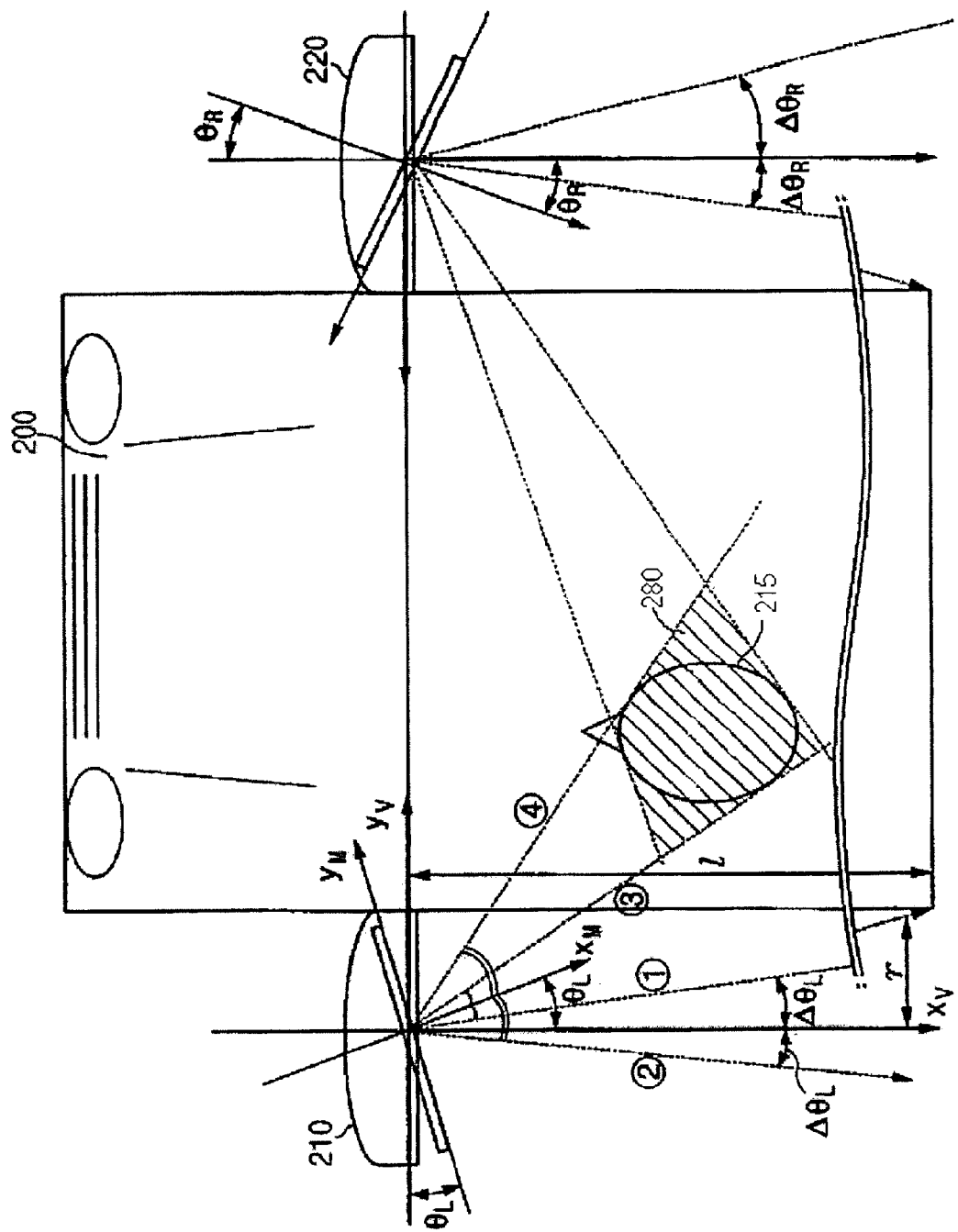
FIG. 2 is a drawing for showing a principle for determination of a horizontal head position of a vehicle driver according to a preferred embodiment of the present invention.
Figure 3:
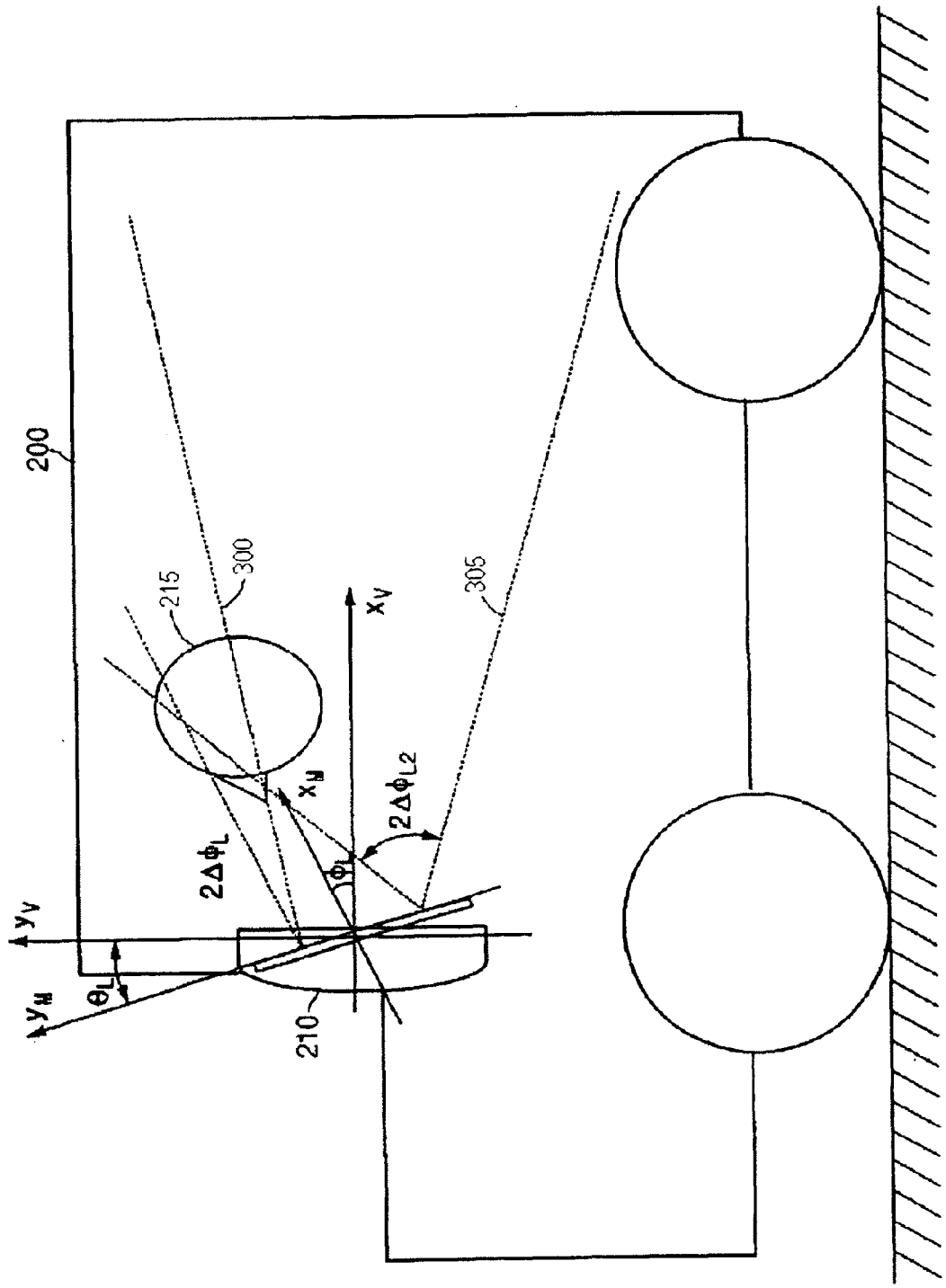
FIG. 3 is a drawing for showing a principle for determination of a vertical head position of a vehicle driver according to an exemplary embodiment of the present invention.

An apparatus according to an exemplary embodiment of the present invention is an apparatus for determining a head position of a driver of a vehicle, wherein the vehicle is provided with a left rearview mirror 210 and a right rearview mirror 220 (refer to FIG. 2 and FIG. 3).

As shown in FIG. 1, an apparatus for determining a head position of a vehicle driver according to an exemplary embodiment of the present invention includes: a first horizontal angle detector 110 for detecting a first horizontal angle $\theta_L$, the first horizontal angle $\theta_L$ being an inclination angle of the left rearview mirror 210 in a horizontal direction; a first vertical angle detector 120 for detecting a first vertical angle $\phi_L$, the first vertical angle $\phi_L$ being an inclination angle of the left rearview mirror 210 in a vertical direction; a second horizontal angle detector 130 for detecting a second horizontal angle $\theta_R$, the second horizontal angle $\theta_R$ being an inclination angle of the right rearview mirror 220 in the horizontal direction; a second vertical angle detector 140 for detecting a second vertical angle $\phi_R$, the second vertical angle $\phi_R$ being an inclination angle of the right rearview mirror 220 in a vertical direction; and an electronic control unit (ECU) 150 for calculating the head position of the driver on the basis of the first and second horizontal angles $\theta_L$ and $\theta_R$ and the first and second vertical angles $\phi_L$ and $\phi_R$.

The first and second horizontal angles $\theta_L$ and $\theta_R$ are respectively detected at the first and second horizontal angle detectors, and the first and second vertical angles $\phi_L$ and $\phi_R$ are respectively detected at the first and second vertical angle detectors.

The first and second horizontal angle detectors 110 and 130 and the first and second vertical angle detectors 120 and 140 may be similar to detectors are already known and used in the related art, e.g., in an Integrated Memory Seat (IMS) system.

In addition, an exemplary embodiment of the present invention, the apparatus may not require additional detectors/components for a vehicle that is equipped with such an IMS system, since such angle detectors 110, 130, 120, and 140 are already adopted therein.

The first horizontal and vertical angle detectors 110 and 120 may be integrally formed as a unit assembly and mounted at the left rearview mirror 210. In addition, the second horizontal and vertical angle detectors 130 and 140 may also be integrally formed as a unit assembly and mounted at the right rearview mirror 220.

The ECU 150 may be realized by one or more processors activated by predetermined software, and the predetermined software can be programmed to perform each step of a method for determining a head position of a vehicle driver according to an exemplary embodiment of this invention, which will be described in detail.

Prior to a detailed description of a method for determining a head position of a vehicle driver according to an exemplary embodiment of the present invention, a principle by which a head position of a vehicle driver can be determined on the basis of output values of the angle detectors 110, 130, 120, and 140 according to an exemplary embodiment of the present invention is firstly described hereinafter.

FIG. 2 is a drawing for showing a principle for determination of a horizontal head position of the vehicle driver according to an exemplary embodiment of the present invention, and such principle will now be described with reference to the drawing.

As shown to the left of FIG. 2, a vehicle body coordinate system may be defined by an x-coordinate $\chi_V$ and a y-coordinate $\gamma_V$. The x-coordinate $\chi_V$ denotes a distance, from a center of the left rearview mirror 210, in an exact rearward direction of the vehicle. The y-coordinate $\gamma_V$ denotes a distance, from a center of the left rearview mirror 210, to a vehicle body 200. Such x- and y-coordinates are only an exemplary way of defining a vehicle body coordinate system, and a different vehicle body coordinate system may be used.

A mirror coordinate system, i.e., a coordinate system with respect to the mirror 210, may be defined by an x-coordinate $\chi_M$ and a y-coordinate $\gamma_M$. The x-coordinate $\chi_M$ denotes a distance, from the center of the left rearview mirror 210, in a normal direction of the mirror surface. The y-coordinate $\gamma_V$ denotes a distance, from a center of the left rearview mirror 210, in a tangential direction of the mirror surface. Such x- and y-coordinates are only an exemplary way of defining a mirror coordinate system, and a different mirror coordinate system may be used.

In FIG. 2, viewing lines of a driver are shown as dotted lines.

Usually a driver sets a rearview mirror to an angular position that can secure a rearview by merely turning his/her head. Accordingly, a minimal portion of the vehicle body 200 is usually found in a view in the mirror. A viewing line 1 of the driver, showing such a state of viewing, is directed rearward and inclined to the vehicle body 200 by a predetermined angle $\Delta\theta_L$ with respect to the exact rearward direction $\chi_V$.

To the contrary, a viewing line 2 inclined outward of the vehicle body 200 forms the predetermined angle $\Delta\theta_L$ with the exact rearward direction $\chi_V$.

The predetermined angle $\Delta\theta_L$ depends on specifications of the left rearview mirror 210 and the vehicle body 200. In more detail, with r denoting a horizontal distance between the vehicle body and a center of the rearview mirror and l denoting a horizontal distance between a rear end of the vehicle body and a center of the rearview mirror in FIG. 2, a relationship of $\Delta\theta_L = \tan^{-1}(r/l)$ is satisfied.

A position of the left rearview mirror 210 may be converted to the head position of the driver as follows.

An angle of an incident viewing line 1 corresponding to the reflection line of the viewing line 3 can be calculated, in the vehicle body coordinate system, on the basis of a horizontal inclination angle $\theta_L$ of the left rearview mirror 210 and the angle $\Delta\theta_L$ of the viewing line 1 inclined with respect to the vehicle body coordinate $\chi_V$. In more detail, an inclination angle by which the viewing line 1 is inclined to the vehicle body 200 from the exact rearward direction $\chi_V$ is calculated as $2\theta_L - \Delta\theta_L$, i.e., $2(\theta_L - \Delta\theta_L) + \Delta\theta_L$.

An angle of an incident viewing line 2 corresponding to the reflection line of the viewing line 4 can be calculated, in the vehicle body coordinate system, on the basis of a horizontal inclination angle $\theta_L$ of the left rearview mirror 210 and the angle $\Delta\theta_L$ of the viewing line 2 inclined with respect to the vehicle body coordinate $\chi_V$. In more detail, an inclination angle by which the viewing line 2 is inclined to the vehicle body 200 from the exact rearward direction $\chi_V$ is calculated as $2\theta_L + \Delta\theta_L$, i.e., $2(\theta_L + \Delta\theta_L) - \Delta\theta_L$.

Therefore, on the basis of the predetermined angle $\Delta\theta_L$ and horizontal inclination angle $\theta_L$ of the left rearview mirror 210, the head position of the driver 215 with respect to the left rearview mirror 210 may be concluded to lie within a range of $2\theta_L - \Delta\theta_L$ to $2\theta_L + \Delta\theta_L$ toward the vehicle body 200 from the rearward direction $\chi_V$ of the vehicle body.

Using the relationship $\Delta\theta_L = \tan^{-1}(r/l)$, such a range may be converted to a range of $2\theta_L - \tan^{-1}(r/l)$ to $2\theta_L + \tan^{-1}(r/l)$.

The same principle can be applied to the right rearview mirror 220. Therefore, on the basis of a predetermined angle $\Delta\theta_R$ and horizontal inclination angle $\theta_R$ of the right rearview mirror 220, the head position of the driver with respect to the right rearview mirror 220 may be concluded to lie within a range of $2\theta_R - \Delta\theta_R$ to $2\theta_R + \Delta\theta_R$ toward the vehicle body 200 from the rearward direction $\chi_V$ of the vehicle body.

Regarding the right rearview mirror 220, a relationship of $\Delta\theta_R = \tan^{-1}(r/l)$ is satisfied, and using this relationship, such a range may be converted to a range of $2\theta_R - \tan^{-1}(r/l)$ to $2\theta_R + \tan^{-1}(r/l)$.

Therefore, summarizing the principles regarding the left rearview mirror 210 and the right rearview mirror 220, the horizontal head position of the vehicle driver can be determined to lie within a range of $2\theta_L - \Delta\theta_L$ to $2\theta_L + \Delta\theta_L$ with respect to the left rearview mirror 210, and within a range of $2\theta_R - \Delta\theta_R$ to $2\theta_R + \Delta\theta_R$ with respect to the right rearview mirror 220. Both the horizontal angle ranges are measured toward a vehicle body from the rearward direction of the vehicle body.

Therefore, in a horizontal plane, the head position of the vehicle driver may be determined to lie within a range including a hatched area 280 shown in FIG. 2.

FIG. 3 is a drawing for showing a principle for determination of a vertical head position of the vehicle driver according to an exemplary embodiment of the present invention. FIG. 3 shows the left side of the vehicle and the left rearview mirror 210.

A principle for determining the vertical head position of a driver on the basis of a vertical inclination angle of the left rearview mirror 210 is hereinafter described with reference to FIG. 3.

In FIG. 3, $\Delta\phi_{L1}$ denotes an angle between a viewing line of the driver and a normal line of the rearview mirror when an uppermost rearview is taken through the left rearview mirror 210. $\Delta\phi_{L2}$ denotes an angle between a viewing line of the driver and a normal line of the rearview mirror when a lowermost rearview is taken through the left rearview mirror 210. The normal line of the left rearview mirror 210 lies on the mirror coordinate $\chi_M$.

The normal line of the left rearview mirror 210 is inclined upward by an angle $\phi_L$ from the exact rearward direction $\chi_V$.

Therefore, when the uppermost view is taken through the left rearview mirror 210, the viewing line 300 of the driver is inclined upward by $\phi_L + \Delta\phi_{L1}$ from the exact rearward direction $\chi_V$ of the vehicle body. In the same way, when the lowermost view is taken through the left rearview mirror 210, the viewing line 305 of the driver is inclined upward by $\phi_L + \Delta\phi_{L2}$ from the exact rearward direction $\chi_V$ of the vehicle body Such a range of the viewing line may be converted to a vertical head position of the driver with respect to the left rearview mirror 210. In more detail, the vertical head position of the driver may be determined to lie within a range of $\phi_L + \Delta\phi_{L1}$ to $\phi_L + \Delta\phi_{L2}$ with respect to the left rearview mirror 210.

When the values of $\Delta\phi_{L1}$ and $\Delta\phi_{L2}$ are predetermined, the vertical head position of the driver can be found from the vertical inclination angle $\phi_L$ of the left rearview mirror 210. Such angles $\Delta\phi_{L1}$ and $\Delta\phi_{L2}$ can be obviously predetermined by collecting data for various drivers and statistically processing the collected data, which does not require undue experiment.

The same principle as described in connection with the left rearview mirror 210 can be applied to the right rearview mirror 220.

Therefore, with $\phi_R$ denoting an angle by which a normal line of the right rearview mirror 220 is inclined upward from the exact rearward direction $\chi_V$, the vertical head position of the driver can be understood to lie within a range of $\phi_R + \Delta\phi_{R1}$ to $\phi_R + \Delta\phi_{R2}$ with respect to the right rearview mirror 220.

When the values of $\Delta\phi_{R1}$ and $\Delta\phi_{R2}$ are predetermined, the vertical head position of the driver can be found from the vertical inclination angle $\phi_R$ of the left rearview mirror 210. Such angles $\Delta\phi_{R1}$ and $\Delta\phi_{R2}$ can be predetermined by collecting data for various drivers and statistically processing the collected data, which does not require undue experiment.

With understanding of such basic principles, a method for determining a head position of a vehicle driver according to an exemplary embodiment of the present invention is hereinafter described in detail.

Figure 4:
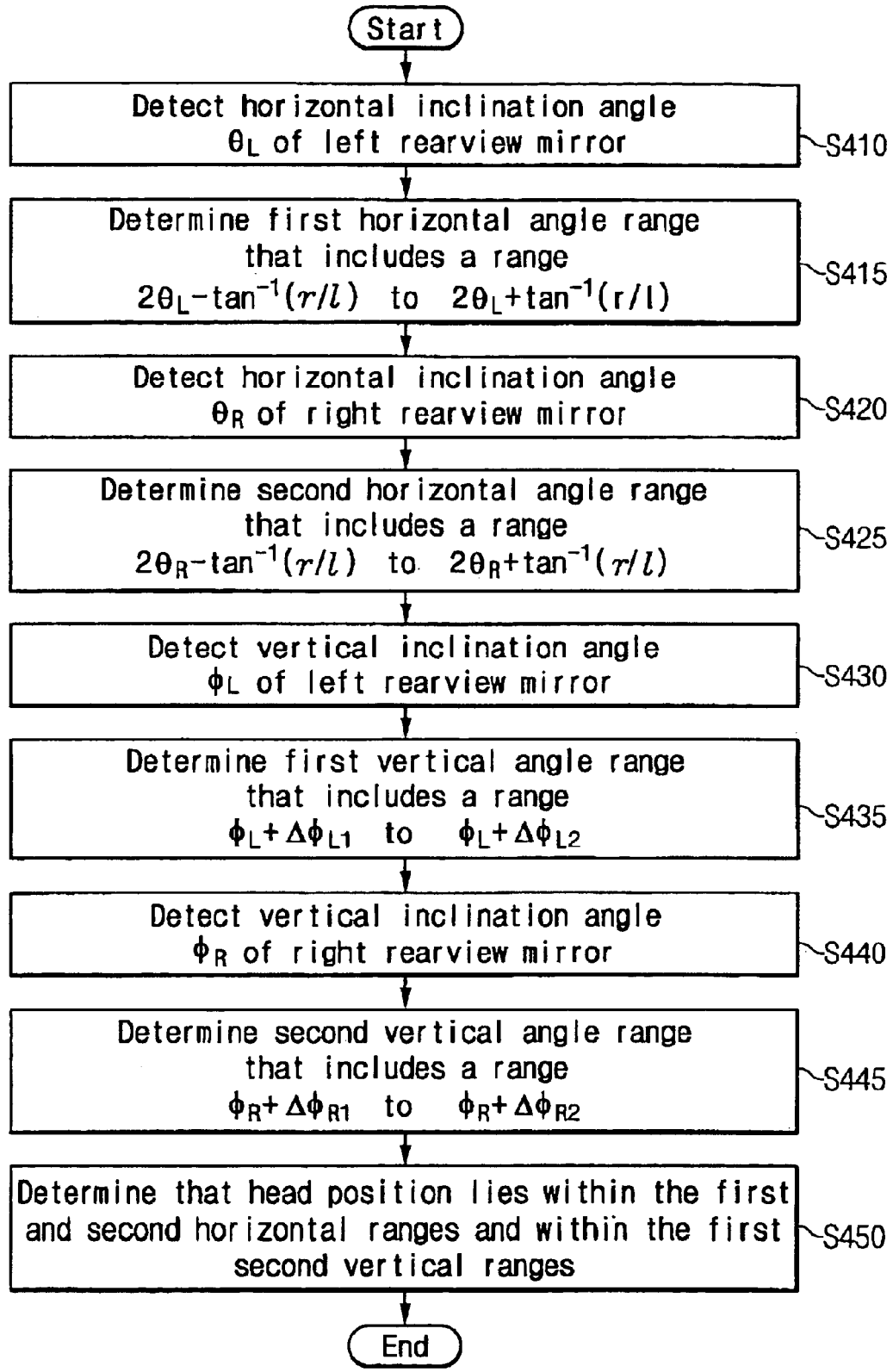
FIG. 4 is a flowchart showing a method for determining a head position of a vehicle driver according to an exemplary embodiment of the present invention.

FIG. 4 is a flowchart showing a method for determining a head position of a vehicle driver according to an exemplary embodiment of the present invention.

As shown in FIG. 4, at step S410, the ECU 150 firstly detects a first horizontal angle $\theta_L$, which is an horizontal inclination angle of the left rearview mirror 210.

Subsequently at step S415, the ECU 150 calculates, on the basis of the first horizontal angle $\theta_L$, a first horizontal angle range of the head position with respect to the left rearview mirror. At the step of S415, the first horizontal angle range is determined so as to include a range of $2\theta_L - \tan^{-1}(r/l)$ to $2\theta_L + \tan^{-1}(r/l)$ toward a vehicle body from the rearward direction of the vehicle body. Here, r denotes a horizontal distance between the vehicle body and a center of the rearview mirror, and l denotes a horizontal distance between a rear end of the vehicle body and a center of the rearview mirror:

In addition, at step S420, the ECU 150 detects a second horizontal angle $\theta_R$, which is a horizontal inclination angle of the right rearview mirror 220.

Subsequently at step S425, the ECU 150 calculates, on the basis of the second horizontal angle $\theta_R$, a second horizontal angle range of the head position with respect to the right rearview mirror. At the step S425, the second horizontal angle range is determined so as to include a range of $2\theta_R - \tan^{-1}(r/l)$ to $2\theta_R + \tan^{-1}(r/l)$ toward a vehicle body from the rearward direction of the vehicle body.

In addition, at step S430, the ECU 150 detects a first vertical angle $\phi_L$, which is a vertical inclination angle of the left rearview mirror 210.

Subsequently at step S435, the ECU 150 calculates, on the basis of the first vertical angle $\phi_L$, a first vertical angle range of the head position with respect to the left rearview mirror. At the step of S435, the first vertical angle range is determined so as to include a range of $\phi_L + \Delta\phi_{L1}$ to $\phi_L + \Delta\phi_{L2}$ upward from a horizontal plane of the vehicle body. Here, $\Delta\phi_{L1}$ and $\Delta\phi_{L2}$ denote predetermined angles.

Subsequently at step S440, the ECU 150 detects a second vertical angle $\phi_R$, which is a vertical inclination angle of the right rearview mirror 220.

At step S445, the ECU 150 calculates, on the basis of the second vertical angle $\phi_R$, a second vertical angle range of the head position with respect to the right rearview mirror. At the step of S445, the second vertical angle range is determined so as to include a range of $\phi_R + \Delta\phi_{R1}$ to $\phi_R + \Delta\phi_{R2}$ upward from a horizontal plane of the vehicle body. Here, $\Delta\phi_{R1}$ and $\Delta\phi_{R2}$ denote predetermined angles.

After calculating the first and second horizontal angle ranges and the first and second vertical angle ranges as above, the ECU 150 determines, at step S450, that the head position of the driver lies within the first and second horizontal angle ranges and also within the first and second vertical angle ranges.

According to another embodiment of the present invention, the head position of a vehicle driver may be determined with enhanced accuracy and/or precision using devices already adoptable to a usual integrated memory seat (IMS) system, without additionally requiring costly devices such as a stereo camera.

Therefore, an exemplary embodiment of the present invention also contributes to improvement of accuracy and/or precision of an application apparatus, e.g., an intelligent air bag system, that functions based on the head position of a vehicle driver.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for determining a head position of a driver of a vehicle, the vehicle comprising a left rearview mirror and a right rearview mirror, the method comprising:
   detecting a first horizontal angle $\theta_L$, the first horizontal angle being an inclination angle of the left rearview mirror in a horizontal direction;
   calculating, on the basis of the first horizontal angle $\theta_L$, a first horizontal angle range of the head position with respect to the left rearview mirror;
   detecting a second horizontal angle $\theta_R$, the second horizontal angle being an inclination angle of the right rearview mirror in the horizontal direction; and
   calculating, on the basis of the second horizontal angle $\theta_R$, a second horizontal angle range of the head position with respect to the right rearview mirror.

2. The method of claim 1, further comprising selecting values for a set of predetermined angles, the predetermined angles consisting of $\Delta\theta_L$ and $\Delta\theta_R$,
   wherein the first horizontal angle range comprises, toward a vehicle body from the rearward direction of the vehicle body, a range of about $2\theta_L - \Delta\theta_L$ to about $2\theta_L + \Delta\theta_L$; and
   the second horizontal angle range comprises, toward a vehicle body from the rearward direction of the vehicle body, a range of about $2\theta_R - \Delta\theta_R$ to about $2\theta_R + \Delta\theta_R$.

3. The method of claim 2, wherein a horizontal distance r measured between the vehicle body and a center of the rearview mirror and a horizontal distance 1 measured between a rear end of the vehicle body and a center of the rearview mirror, satisfies first and second equations, the first equation consisting of $\Delta\theta_R = \tan^{-1}(r/l)$, and the second equation consisting of $\Delta\theta_L = \tan^{-1}(r/l)$.

4. The method of claim 3, further comprising:
   detecting a first vertical angle $\phi_L$, the first vertical angle being an inclination angle of the left rearview mirror in a vertical direction;
   calculating, on the basis of the first vertical angle $\phi_L$, a first vertical angle range of the head position with respect to the left rearview mirror;
   detecting a second vertical angle $\phi_R$, the second vertical angle being an inclination angle of the right rearview mirror in a vertical direction; and
   calculating, on the basis of the second vertical angle $\phi_R$, a second vertical angle range of the head position with respect to the right rearview mirror.

5. The method of claim 4, further comprising selecting values for a set of predetermined angles, the predetermined angles consisting of $\Delta\phi_{L1}$, $\Delta\phi_{L2}$, $\Delta\phi_{R1}$, and $\Delta\phi_{R2}$,
   wherein the first vertical angle range comprises, upward from a horizontal plane of a vehicle body, a range of $\phi_L + \Delta\phi_{L1}$ to $\phi_L + \Delta\phi_{L2}$; and
   the second vertical angle range comprises, upward from the horizontal plane of the vehicle body, a range of $\phi_R + \Delta\phi_{R1}$ to $\phi_R + \Delta\phi_{R2}$.

6. The method of claim 2, further comprising:
   detecting a first vertical angle $\phi_L$, the first vertical angle being an inclination angle of the left rearview mirror in a vertical direction;
   calculating, on the basis of the first vertical angle $\phi_L$, a first vertical angle range of the head position with respect to the left rearview mirror;
   detecting a second vertical angle $\phi_R$, the second vertical angle being an inclination angle of the right rearview mirror in a vertical direction; and
   calculating, on the basis of the second vertical angle $\phi_R$, a second vertical angle range of the head position with respect to the right rearview mirror.

7. The method of claim 6, further comprising selecting values for a set of predetermined angles, the predetermined angles consisting of $\Delta\phi_{L1}$, $\Delta\phi_{L2}$, $\Delta\phi_{R1}$, and $\Delta\phi_{R2}$,
   wherein the first vertical angle range comprises, upward from a horizontal plane of a vehicle body, a range of $\phi_L + \Delta\phi_{L1}$ to $\phi_L + \Delta\phi_{L2}$; and
   the second vertical angle range comprises, upward from the horizontal plane of the vehicle body, a range of $\phi_R + \Delta\phi_{R1}$ to $\phi_R + \Delta\phi_{R2}$.

8. The method of claim 1, further comprising:
   detecting a first vertical angle $\phi_L$, the first vertical angle being an inclination angle of the left rearview mirror in a vertical direction;
   calculating, on the basis of the first vertical angle $\phi_L$, a first vertical angle range of the head position with respect to the left rearview mirror;
   detecting a second vertical angle $\phi_R$, the second vertical angle being an inclination angle of the right rearview mirror in a vertical direction; and
   calculating, on the basis of the second vertical angle $\phi_R$, a second vertical angle range of the head position with respect to the right rearview mirror.

9. The method of claim 8, further comprising selecting values for a set of predetermined angles, the predetermined angles consisting of $\Delta\phi_{L1}$, $\Delta\phi_{L2}$, $\Delta\phi_{R1}$, and $\Delta\phi_{R2}$,
   wherein the first vertical angle range comprises, upward from a horizontal plane of a vehicle body, a range of $\phi_L + \Delta\phi_{L1}$ to $\phi_L + \Delta\phi_{L2}$; and
   the second vertical angle range comprises, upward from the horizontal plane of the vehicle body, a range of $\phi_R + \Delta\phi_{R1}$ to $\phi_R + \Delta\phi_{R2}$.

10. A method for determining a head position of a driver of a vehicle, the vehicle comprising a left rearview mirror and a right rearview mirror, the method comprising:
    detecting a first vertical angle $\phi_L$, the first vertical angle being an inclination angle of the left rearview mirror in a vertical direction;
    calculating, on the basis of the first vertical angle $\phi_L$, a first vertical angle range of the head position with respect to the left rearview mirror;
    detecting a second vertical angle $\phi_R$, the second vertical angle being an inclination angle of the right rearview mirror in a vertical direction; and
    calculating, on the basis of the second vertical angle $\phi_R$, a second vertical angle range of the head position with respect to the right rearview mirror.

11. The method of claim 10, further comprising selecting values for a set of predetermined angles, the predetermined angles consisting of $\Delta\phi_{L1}$, $\Delta\phi_{L2}$, $\Delta\phi_{R1}$, and $\Delta\phi_{R2}$,
    wherein the first vertical angle range comprises, upward from a horizontal plane of a vehicle body, a range of $\phi_L + \Delta\phi_{L1}$ to $\phi_L + \Delta\phi_{L2}$; and
    the second vertical angle range comprises, upward from the horizontal plane of the vehicle body, a range of $\phi_R + \Delta\phi_{R1}$ to $\phi_R + \Delta\phi_{R2}$.

12. An apparatus for determining a head position of a driver of a vehicle, the vehicle comprising a left rearview mirror and a right rearview mirror, the apparatus comprising:
    a first horizontal angle detector for detecting a first horizontal angle $\theta_L$, the first horizontal angle being an inclination angle of the left rearview mirror in a horizontal direction;
    a second horizontal angle detector for detecting a second horizontal angle $\theta_R$, the second horizontal angle being an inclination angle of the right rearview mirror in the horizontal direction; and an electronic control unit for calculating the head position of the driver on the basis of the first and second horizontal angles $\theta_L$ and $\theta_R$ that are detected at the first and second horizontal angle detectors respectively, wherein the electronic control unit at least performs:

detecting the first horizontal angle $\theta_L$;

calculating, on the basis of the first horizontal angle $\theta_L$, a first horizontal angle range of the head position with respect to the left rearview mirror;

detecting the second horizontal angle $\theta_R$; and calculating, on the basis of the second horizontal angle $\theta_R$, a second horizontal angle range of the head position with respect to the right rearview mirror.

13. The apparatus of claim 12, further comprising selecting values for a set of predetermined angles, the predetermined angles consisting of $\Delta\theta_L$ and $\Delta\theta_R$, wherein the first horizontal angle range comprises, toward a vehicle body from the rearward direction of the vehicle body, a range of $2\theta_L-\Delta\theta_L$ to $2\theta_L+\Delta\theta_L$; and the second horizontal angle range comprises, toward a vehicle body from the rearward direction of the vehicle body, a range of $2\theta_R-\Delta\theta_R$ to $2\theta_R+\Delta\theta_R$.

14. The apparatus of claim 13, wherein, a horizontal distance r measured between the vehicle body and a center of the rearview mirror and a horizontal distance l measured between an end of the vehicle body and a center of the rearview mirror satisfies first and second equations, the first equation consisting of $\Delta\theta_R=\tan^{-1}(r/l)$, and the second equation consisting of $\Delta\theta_L=\tan^{-1}(r/l)$.

15. The apparatus of claim 14, further comprising a first vertical angle detector for detecting a first vertical angle $\phi_L$, the first vertical angle being an inclination angle of the left rearview mirror in a vertical direction; and a second vertical angle detector for detecting a second vertical angle $\phi_R$, the second vertical angle being an inclination angle of the right rearview mirror in a vertical direction, wherein the electronic unit further performs:

detecting the first vertical angle $\phi_L$;

calculating, on the basis of the first vertical angle $\phi_L$, a first vertical angle range of the head position with respect to the left rearview mirror;

detecting the second vertical angle $\phi_R$; and calculating, on the basis of the second vertical angle $\phi_R$, a second vertical angle range of the head position with respect to the right rearview mirror.

16. The apparatus of claim 15, further comprising selecting values for a set of predetermined angles, the predetermined angles consisting of $\Delta\phi_{L1}$, $\Delta\phi_{L2}$, $\Delta\phi_{R1}$, and $\Delta\phi_{R2}$, wherein the first vertical angle range comprises, upward from a horizontal plane of a vehicle body, a range of $\phi_L+\Delta\phi_{L1}$ to $\phi_L+\Delta\phi_{L2}$; and the second vertical angle range comprises, upward from the horizontal plane of the vehicle body, a range of $\phi_R+\Delta\phi_{R1}$ to $\phi_R+\Delta\phi_{R2}$.

17. The apparatus of claim 13, further comprising a first vertical angle detector for detecting a first vertical angle $\phi_L$, the first vertical angle being an inclination angle of the left rearview mirror in a vertical direction; and a second vertical angle detector for detecting a second vertical angle $\phi_R$, the second vertical angle being an inclination angle of the right rearview mirror in a vertical direction, wherein the electronic unit further performs:

detecting the first vertical angle $\phi_L$;

calculating, on the basis of the first vertical angle $\phi_L$, a first vertical angle range of the head position with respect to the left rearview mirror;

detecting the second vertical angle $\phi_R$; and calculating, on the basis of the second vertical angle $\phi_R$, a second vertical angle range of the head position with respect to the right rearview mirror.

18. The apparatus of claim 17, further comprising selecting values for a set of predetermined angles, the predetermined angles consisting of $\Delta\phi_{L1}$, $\Delta\phi_{L2}$, $\Delta\phi_{R1}$, and $\Delta\phi_{R2}$, wherein the first vertical angle range comprises, upward from a horizontal plane of a vehicle body, a range of $\phi_L+\Delta\phi_{L1}$ to $\phi_L+\Delta\phi_{L2}$; and the second vertical angle range comprises, upward from the horizontal plane of the vehicle body, a range of $\phi_R+\Delta\phi_{R1}$ to $\phi_R+\Delta\phi_{R2}$.

19. The apparatus of claim 12, further comprising a first vertical angle detector for detecting a first vertical angle $\phi_L$, the first vertical angle being an inclination angle of the left rearview mirror in a vertical direction; and a second vertical angle detector for detecting a second vertical angle $\phi_R$, the second vertical angle being an inclination angle of the right rearview mirror in a vertical direction, wherein the electronic unit further performs:

detecting the first vertical angle $\phi_L$;

calculating, on the basis of the first vertical angle $\phi_L$, a first vertical angle range of the head position with respect to the left rearview mirror;

detecting the second vertical angle $\phi_R$; and calculating, on the basis of the second vertical angle $\phi_R$, a second vertical angle range of the head position with respect to the right rearview mirror.

20. The apparatus of claim 19, further comprising selecting values for a set of predetermined angles, the predetermined angles consisting of $\Delta\phi_{L1}$, $\Delta\phi_{L2}$, $\Delta\phi_{R1}$, and $\Delta\phi_{R2}$, wherein the first vertical angle range comprises, upward from a horizontal plane of a vehicle body, a range of $\phi_L+\Delta\phi_{L1}$ to $\phi_L+\Delta\phi_{L2}$; and the second vertical angle range comprises, upward from the horizontal plane of the vehicle body, a range of $\phi_R+\Delta\phi_{R1}$ to $\phi_R+\Delta\phi_{R2}$.

21. An apparatus for determining a head position of a driver of a vehicle, the vehicle comprising a left rearview mirror and a right rearview mirror, the apparatus comprising:

a first vertical angle detector for detecting a first vertical angle $\phi_L$, the first vertical angle being an inclination angle of the left rearview mirror in a vertical direction;

a second vertical angle detector for detecting a second vertical angle $\phi_R$, the second vertical angle being an inclination angle of the right rearview mirror in a vertical direction; and an electronic control unit for calculating the head position of the driver on the basis of the first and second vertical angles $\phi_L$ and $\phi_R$ that are detected at the first and second vertical angle detectors respectively, wherein the electronic control unit at least performs:

detecting a first vertical angle $\phi_L$, the first vertical angle being an inclination angle of the left rearview mirror in a vertical direction;

calculating, on the basis of the first vertical angle $\phi_L$, a first vertical angle range of the head position with respect to the left rearview mirror;

detecting a second vertical angle $\phi_R$, the second vertical angle being an inclination angle of the right rearview mirror in a vertical direction; and calculating, on the basis of the second vertical angle $\phi_R$, a second vertical angle range of the head position with respect to the right rearview mirror.

22. The apparatus of claim 21, further comprising selecting values for a set of predetermined angles, the predetermined angles consisting of $\Delta\phi_{L1}$, $\Delta\phi_{L2}$, $\Delta\phi_{R1}$, and $\Delta\phi_{R2}$, wherein the first vertical angle range comprises, upward from a horizontal plane of a vehicle body, a range of $\phi_L+\Delta\phi_{L1}$ to $\phi_L+\Delta\phi_{L2}$; and the second vertical angle range comprises, upward from the horizontal plane of the vehicle body, a range of $\phi_R+\Delta\phi_{R1}$ to $\phi_R+\Delta\phi_{R2}$.

* * * * *